United States Patent
Newton et al.

(10) Patent No.: US 8,949,270 B2
(45) Date of Patent: Feb. 3, 2015

(54) METHODS AND SYSTEMS FOR PROCESSING SOCIAL MEDIA DATA

(75) Inventors: Christopher Daniel Newton, Fredericton (CA); Derek Brian Hatchard, New Maryland (CA); Timothy Frederic Beatty, Fredericton (CA); Gregory Marc Picot, Saint John (CA)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/415,687

(22) Filed: Mar. 8, 2012

(65) Prior Publication Data

US 2012/0233212 A1 Sep. 13, 2012

Related U.S. Application Data

(60) Provisional application No. 61/451,516, filed on Mar. 10, 2011.

(51) Int. Cl.
*G06F 7/00* (2006.01)
*G06F 17/30* (2006.01)
*G06Q 30/02* (2012.01)

(52) U.S. Cl.
CPC ................... *G06Q 30/02* (2013.01)
USPC ........................................ 707/774

(58) Field of Classification Search
USPC .................. 705/319; 707/600, 774
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |

(Continued)

OTHER PUBLICATIONS

U.S. Appl. No. 13/478,002, filed May 22, 2012.

(Continued)

*Primary Examiner* — Robert Beausoliel, Jr.
*Assistant Examiner* — Nicholas Allen
(74) *Attorney, Agent, or Firm* — Ingrassia Fisher & Lorenz, P.C.

(57) ABSTRACT

Methods and systems are provided for processing social media data. The method includes receiving a request from a user for social media analytics of social media data; sending the social media data to a first analytics provider and a second analytics provider; receiving first analytics data from the first data analytics provider and second analytics data from the second analytics provider; storing the first analytics data and the second analytics data in a database; and presenting the first analytics data and the second analytics data to the user.

18 Claims, 10 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,281,022 B2 | 10/2007 | Gruhl et al. |
| 7,340,411 B2 | 3/2008 | Cook |
| 7,373,599 B2 | 5/2008 | McElfresh et al. |
| 7,406,501 B2 | 7/2008 | Szeto et al. |
| 7,426,557 B2 | 9/2008 | Gruhl et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,685,091 B2 | 3/2010 | Boone et al. |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,933,843 B1 * | 4/2011 | von Groll et al. ............ 705/319 |
| 7,945,653 B2 | 5/2011 | Zuckerberg et al. |
| 7,970,895 B2 | 6/2011 | Gruhl et al. |
| 7,974,983 B2 | 7/2011 | Goeldi |
| 7,991,764 B2 | 8/2011 | Rathod |
| 8,005,896 B2 | 8/2011 | Cheah |
| 8,010,539 B2 | 8/2011 | Blair-Goldensohn et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0256905 A1 | 11/2005 | Gruhl et al. |
| 2005/0256949 A1 | 11/2005 | Gruhl et al. |
| 2006/0200444 A1 | 9/2006 | Bracho et al. |
| 2006/0284873 A1 | 12/2006 | Forrest et al. |
| 2007/0214097 A1 | 9/2007 | Parsons et al. |
| 2007/0233656 A1 | 10/2007 | Bunescu et al. |
| 2007/0239452 A1 | 10/2007 | Madhavan et al. |
| 2008/0010270 A1 | 1/2008 | Gross |
| 2008/0082399 A1 | 4/2008 | Noble et al. |
| 2008/0082586 A1 | 4/2008 | Jasik et al. |
| 2008/0147487 A1 | 6/2008 | Hirshberg |
| 2008/0154798 A1 | 6/2008 | Valz |
| 2008/0209320 A1 | 8/2008 | Mawhinney et al. |
| 2008/0228695 A1 | 9/2008 | Sifry et al. |
| 2008/0288516 A1 | 11/2008 | Hadfield |
| 2009/0018996 A1 * | 1/2009 | Hunt et al. .................... 707/2 |
| 2009/0048904 A1 * | 2/2009 | Newton et al. ................ 705/10 |
| 2009/0138427 A1 * | 5/2009 | Kalavade ...................... 707/1 |
| 2009/0157668 A1 | 6/2009 | Newton |
| 2009/0192896 A1 | 7/2009 | Newton |
| 2009/0204507 A1 * | 8/2009 | Cockayne et al. ............. 705/26 |
| 2009/0222743 A1 | 9/2009 | Hadfield |
| 2009/0281851 A1 | 11/2009 | Newton |
| 2009/0319518 A1 | 12/2009 | Koudas et al. |
| 2010/0063877 A1 * | 3/2010 | Soroca et al. ............. 705/14.45 |
| 2010/0063959 A1 | 3/2010 | Doshi et al. |
| 2010/0070485 A1 | 3/2010 | Parsons et al. |

(56) References Cited

U.S. PATENT DOCUMENTS

| | | | |
|---|---|---|---|
| 2010/0088234 A1* | 4/2010 | Moore et al. | 705/52 |
| 2010/0094878 A1* | 4/2010 | Soroca et al. | 707/748 |
| 2010/0119053 A1* | 5/2010 | Goeldi | 379/265.09 |
| 2010/0125502 A1 | 5/2010 | Solomon et al. | |
| 2010/0217757 A1 | 8/2010 | Fujioka | |
| 2010/0241576 A1 | 9/2010 | Beeri | |
| 2010/0274815 A1* | 10/2010 | Vanasco | 707/798 |
| 2011/0041153 A1* | 2/2011 | Simon et al. | 725/46 |
| 2011/0106589 A1* | 5/2011 | Blomberg et al. | 705/7.39 |
| 2011/0209067 A1 | 8/2011 | Bogess et al. | |
| 2011/0246816 A1* | 10/2011 | Hsieh et al. | 714/4.12 |
| 2011/0258204 A1 | 10/2011 | Hubbard et al. | |
| 2011/0314142 A1 | 12/2011 | Newton | |
| 2012/0182882 A1* | 7/2012 | Chrapko et al. | 370/248 |
| 2012/0296920 A1 | 11/2012 | Sahni et al. | |

OTHER PUBLICATIONS

Consistent Hashing, From Wikipedia, the free encyclopedia, Retrieved form the internet at URL: http://en.wikipedia.org/wiki/Consistent_hashing on Mar. 8, 2012.

Mongo DB, Added by Tony Hannan, last edited on Sep. 15, 2011, Retrieved form the internet at URL: http://www.mongodb.org/display/DOCS/Introduction on Mar. 8, 2012.

Linear Combination—Wikipedia (http://en.wikipedia.org/wiki/Linear_Combination (accessed Jul. 16, 2012).

Final Office Action for U.S. Appl. No. 12/437,418, mailed Apr. 16, 2012.

Final Office Action for U.S. Appl. No. 12/356,429, mailed May 2, 2012.

Notice of Allowance for U.S. Appl. No. 12/819,402, mailed May 14, 2012.

Non-Final Office Action for U.S. Appl. No. 13/453,802, mailed Jun. 8, 2012.

USPTO, Final Office Action, for U.S. Appl. No. 13/074,809, mailed Feb. 14, 2013.

USPTO, Notice of Allowance, for U.S. Appl. No. 13/526,246, mailed Feb. 14, 2013.

USPTO, Notice of Allowance, for U.S. Appl. No. 12/356,429, mailed Feb. 15, 2013.

United States Patent Office, U.S. Non-Final Office Action for U.S. Appl. No. 12/278,277 dated Sep. 14, 2012.

United States Patent Office, U.S. Non-Final Office Action for U.S. Appl. No. 13/074,809 dated Oct. 3, 2012.

\* cited by examiner

METHODS AND SYSTEMS FOR PROCESSING SOCIAL MEDIA DATA

PRIORITY CLAIM

This application claims the benefit of U.S. Provisional Application No. 61/451,516 filed Mar. 10, 2011, the entirety of which is hereby incorporated by reference.

TECHNICAL FIELD

The present invention relates to social media data and social media analytics data, and, in particular, to a method and system for processing social media data across multiple data analytics providers.

BACKGROUND

Social media content is growing rapidly every year, along with the number of analytics providers processing and analyzing the social media content. The time spent on searching and analyzing the data offered by various analytics providers may be too long, and by the time the analysis and comparisons between different analytics providers are completed, the situation in the social media may have already changed, and the collected data may be outdated.

Accordingly, it is desirable to provide a platform for rapidly retrieving and processing social media data in a real-time or in-line manner. In addition, it is desirable to provide enhanced processing of social media data. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide a platform for the acquisition, storage, and rapid retrieval of metadata or analytics about objects. The objects discussed herein are generally directed to social media content and social media sources (e.g., social media data), but may include other types of content and sources as well. In particular, the systems and methods enable subscription to and acquisition of social media data and social media analytics data from multiple analytics providers. For example, the systems and methods may aggregate the results from the multiple providers to enable end-users to conduct data analysis, data mining, and data reporting operations accessed through multiple system user interfaces. This provides users the ability to selectively choose and combine analytics data from multiple providers in order to realize more value than could be otherwise gained from a single provider.

Figure 1:
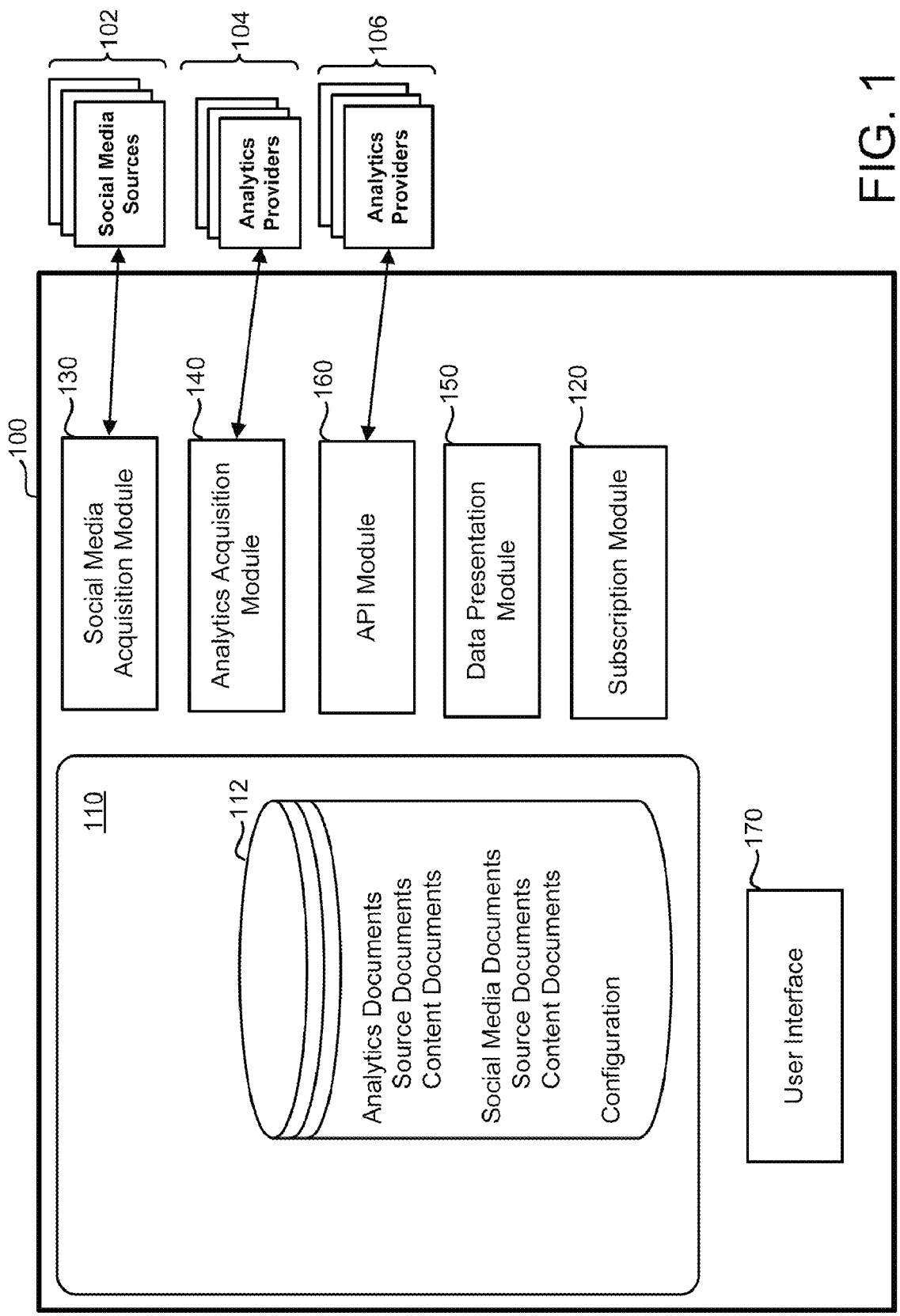
FIG. 1 is a block diagram of a system for processing social media data in accordance with an exemplary embodiment.

FIG. 1 is a block diagram of a system 100 for processing social media data in accordance with an exemplary embodiment. In general, the system 100 collects social media data from one or more social media sources 102. As described below, the social media data may be associated with the content (e.g., a blog posting) or the source (e.g., a blog author) of the social media and may be stored as social media documents. Collectively, social media sources 102 may be referred to as the "social web." The social media sources 102 are typically publicly available sources of media or multimedia content, such as web content including text, audio, video, images or any combination thereof. In some instances, the social media sources may also include privately available sources of media or multimedia content. The social media sources 102 may include on-line publications by social media communities, such as blogospheres hosting various content, for example, web posts, articles, websites, consumer generated audio and/or videos, consumer generated images, or any other content that the system 100 may access. Specific examples include Facebook and Twitter.

The social media data may be organized according to topic profiles (e.g., according to keywords) that may be of interest to a user. As a result, each topic profile is a container that allows a user to enter words and apply filters to search data. In one exemplary embodiment, the topic profiles may be structured by keywords in a hierarchy of groups. A sample structure is provided below.

```
Topic Profile: "Coca-Cola" (
BRANDS keyword group:
(
    CONTAINS
        "New Coke"
        OR "Glass Bottle"
        OR "Recycling"
    AND CONTAINS
        "Coke"
        OR "Coca-cola"
        OR "Classic"
    AND DOES NOT CONTAIN
        "Cherry Coke"
        OR "Coke Zero"
)
AND COMPETITORS keyword group:
(
    CONTAINS
        "Pepsi-cola"
        OR "Pepsi"
        OR "Jolt"
        OR "Pepsi Clear"
    AND CONTAINS
        "Cola"
    AND DOES NOT CONTAIN
        "Sprite"
        OR "7-Up"
        OR "Fanta"
        OR "Gatoraid"
)
AND INDUSTRY keyword group:
(
    CONTAINS
        "Soda"
        OR "Pop"
    AND CONTAINS
        "Carbonated Beverage"
        OR "Soft Drinks"
    AND DOES NOT CONTAIN
        "Juice"
        OR "Milk"
)
AND FILTERED By:
(
    MEDIA TYPES
        "BLOGS"
        OR "MICROMEDIA"
        OR "VIDEOS"
    AND LANGUAGES
        "English"
        OR "Spanish"
        OR "French"
)
```

The system 100 may further interact with one or more social media analytics providers 104, 106. In general and as discussed in greater detail below, the analytics providers 104, 106 receive the social media data from the system 100 and analyze the social media data to produce social media analytics data, which may be stored as analytics documents by the system 100. As described in greater detail below, the analytics providers 104, 106 may interact with the system 100 as embedded analytics providers 104 or external analytics providers 106. Analytics may be considered the development of optimal or realistic decision recommendations or insights for a data set derived through the application of statistical models and analysis. As an example, analytics data may provide information about trends developing about a product or brand; like and dislikes about a product or brand; topics being discussed related to a product or brand; key product attributes; and demographics and social profile data of people discussing a product or brand.

As such, the analytics providers 104, 106 may provide the any suitable type of analytics data. As a more specific example, the analytics providers 104, 106 may extract identifiable entities from documents. Entities may represent such things as place names, company names, or names of things. For example, a document analyzed about a travel destination may have identifiable entities for place names such as the destinations mentioned (Sao Paulo, Antigua, Barbados), or the companies mentioned (Sunwing, Travelocity, Expedia), and may reference activities or things mentioned (sailing, snorkeling, hiking) As another example, the analytics providers 104, 106 may provide information about the inference of meaning of an object by processing the natural language to determine such things as tone, intent, subjects, or themes. In other words, "positive sentiment," "negative sentiment," and the phrases that imply such sentiment may be provided with respect to a news article about the championship win of a sports team or an article about a stock market decline. As another example, associative analysis from analytics providers 104, 106 may link data from external sources to the data provided for analysis, e.g., using the author information to search external repositories to determine gender, location, or age range, or to determine connections an author may have to other authors.

Now turning to the details of FIG. 1, the system 100 includes a control module 110, a subscription module 120, a social media acquisition module 130, an analytics acquisition module 140, a data presentation module 150, an API module 160, and a user interface 170. Each of the modules 110, 120, 130, 140, 150, 160 is introduced below in an overview of the system 100 prior to a more detailed description of the modules 110, 120, 130, 140, 150, 160 in subsequent sections. Although the modules 110, 120, 130, 140, 150, 160 are discussed separately, one or more of the modules 110, 120, 130, 140, 150, 160 may be integrated with one another or divided into additional submodules.

Although not shown, the system 100 may communicate with users, social media sources 102, and analytics providers 104, 106 in any suitable manner, including via a public network, Internet, a Public Switched Telephone Network (PSTN), a mobile network, or any other network providing connectivity. The modules 110, 120, 130, 140, 150, 160 and interface 170 may be implemented with software running on a hardware platform, for example, a general purpose or specialized computer, including a processor, and a computer readable medium (e.g., a memory and other storage devices such as CD, DVD, hard disk drive, etc.) having instructions stored thereon for execution by the processor.

In general, the control module 110 controls the interaction of the modules 120, 130, 140, 150, 160 and user interface 170, including providing the instructions and data to carry out the functions described below. The control module 110 includes a database 112 that stores at least some of the data associated with the system 100 including data received from and provided to the modules 120, 130, 140, 150, 160, as discussed below.

In one exemplary embodiment, the database 112 may store system configuration data, social media data, and analytics data. In general, each of the social media data and analytics data may be categorized as content documents or source documents. Data stored in the database 112 may further be stored according to providers, packages, types, subscriptions, and system configuration.

The database 112 may be a document-based, non-hierarchical database. In one exemplary embodiment, the database 112 is a MongoDB system designed for horizontal scalability. For example, data may be distributed across instances of the database 112 as "shards," although other distribution arrangements may be provided. For example, alternate embodiments may use a traditional hierarchical database and document indexing system In general, the database 112 may provide a flexible data model in order to consistently query according to a predefined document format used throughout the system 100 to rapidly retrieve documents. As an example, a document format with query-able analytics instance may contain fields for analytics types, and each field may contain a list of one or more values. Each document may have an associated identification (ID), such as {"Company": ["CNN"], "TVShow": ["Reporter's Notebook"], "_id": "146129369"}.

As noted above, the database 112 stores information from and provides information to the various modules 120, 130, 140, 150, 160 and user interface 170. The subscription module 120 provides a platform for the user to request social media data and social media analytics data from the system 100. As described below, the subscription module 120 enables the user to select social media topic profiles or packages of topic profiles from multiple analytics providers 104, 106.

The social media acquisition module 130 is configured to receive instructions from the control module 110, including social media data requests from the user. The social media data requests may be in the form of topic profile requests. In response, the social media acquisition module 130 gathers data from social media sources 102 related to the requested topic profiles.

The analytics acquisition module 140 is configured to receive instructions from the control module 110 and to provide requested data in response to those instructions. As an example, the analytics acquisition module 140 may receive social media data collected by the social media acquisition module 130 and provide the social media data to one or more data analytics providers 104. Subsequently, the data analytics providers 104 return analytics data based on the social media data. As introduced above, analytics providers 104 that interact with the analytics acquisition module 140 may be embedded analytics providers. As such, analytics acquisition module 140 reads directly from the queue of documents to be processed and writes data directly to the database 112. Accordingly, the analytics acquisition module 140 may initiate communications with the data analytics providers 104 and is responsible for parsing the results and converting them into a format suitable for the database 112.

In general, the API module 160 provides a platform for external data analytics providers 106 to interact with the system 100. The API module 160 may generally provide a similar function to that of analytics acquisition module 140. However, the API module 160 may be a web-based application-programming interface that enables the analytics providers 106 to program directly on the system 100 for customized interaction and function. As such, the API module 160 may be considered an intermediary API that abstracts away the dispatch queue and database interactions for analytics providers 106. In other words, analytics providers 106 may initiate communication to receive content and then submit properly formatted analytics data to the API module 160. As such, the API module 160 is responsible for reading from the dispatch queue and writing to the database 112 on behalf of the analytics providers 106.

The data presentation module 150 generally responds to user queries for viewing social media data and analytics data. For example, the data presentation module 150 may retrieve and format such data for presentation to the user.

The user interface 170 provides an interface or dashboard for the user to interact with the system 100, including requesting, receiving, and interacting with social media data and social media analytics data from the system 100, particularly the modules 120, 130, 140, 150, 160 described above. The user interface 170 may take one of a number of forms, including a dashboard interface, an engagement console, and other interfaces, such as a mobile interface or summary interface.

As an example, the user interface 170 as a dashboard interface may be a hosted software service accessible via an Internet web browser and function as a primary interface used by users to monitor, analyze, and engage social media data and social media analytics data. The dashboard interface allows the user to interact with data using screen-based objects referred to as the dashboard widgets. Such widgets may include 1) a conversation cloud widget that enables the user to view and drilldown on a summary of key terms and phrases discovered in their topic profile; 2) a topic analysis widget that enables the user to perform comparison analysis using Boolean search that renders an interactive bar or pie chart; 3) a topic trends widget that enables the user to perform time-based trend analysis using Boolean search that renders an interactive trend line chart; 4) a river of news widget that presents a summary of content discovered by the platform for the topic profile allowing the user to interact with each document for workflow purposes or analysis purposes; and 5) an influencers widget that presents an interactive list of most influential sources for the topic profile. The widgets allow the user to configure time periods, apply filters, allow interactive drilldown, and export data in to various formats including scheduled reports and alerts.

As another example, the user interface 170 as an engagement console may be a computer desktop application primarily used for team-based workflow of social media content engagement. The engagement console presents topic profile content into configurable "stacks" such that users can interact on individual posts. Stacks may also support various filters and execution of workflow macros.

In general and as described in greater detail below, the system 100 operates as follows. Initially, the user subscribes to a service of the system 100 via the subscription module 120 in which one or more topic profiles and analytics providers (e.g., one or more of the analytics providers 104, 106) are selected by the user. The subscription module 120 registers the subscription within a user search profile stored in the database 112. The social media acquisition module 130 retrieves social media data associated with the topic profile from the social media sources 102 and/or from social media data already stored in the database 112. The social media data is placed in provider queues in the analytics acquisition module 140 and sent to the selected analytics providers 104, 106. In response, the analytics providers 104, 106 return analytics data to the analytics acquisition module 140, which is stored in the database 112. The user may access the analytics data via the user interface 170 and data presentation module 150. Accordingly, the system 100 provides a user with social media data and analytics data from a number of sources on a single system. Additional details about the system 100 and associated modules 120, 130, 140, 150, 160 are provided below.

Figure 2:
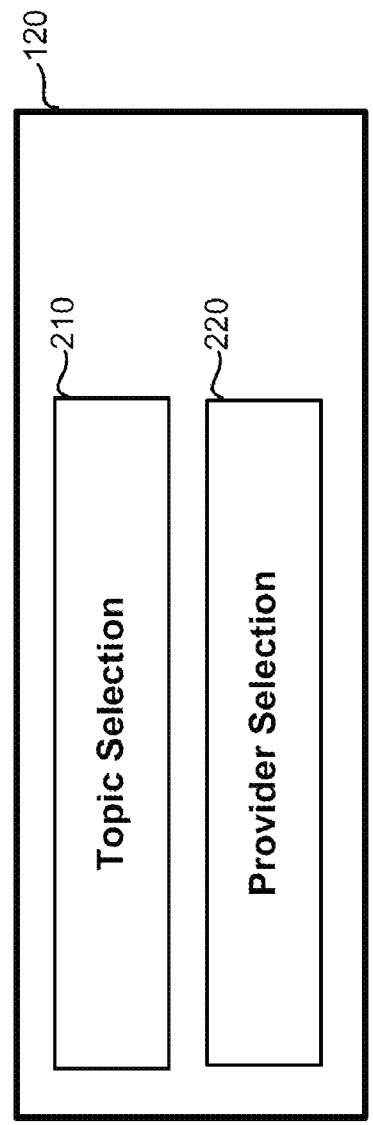
FIG. 2 is a block diagram of a subscription module of the system of FIG. 1 in accordance with an exemplary embodiment.

FIG. 2 is a block diagram of the subscription module 120 of the system 100 of FIG. 1 in accordance with an exemplary embodiment. In general, the subscription module 120 provides an interface for the user to initiate the collection and analysis of social media data. As shown in FIG. 2, the subscription module 120 may include a topic selection submodule 210 and a provider selection submodule 220. In general, the topic selection submodule 210 generates a list of available topic profiles, and the provider selection submodule 220 generates a list of available providers, as shown in greater detail below. As such, in one exemplary embodiment, the user may select one or more topics for collection and analysis via the topic selection submodule 210 and select one or more providers to perform the analysis via the provider selection submodule 220. The provider selection submodule 220 may also enable a user to browse packages of analytics groupings, select multiple providers, and manage current subscriptions.

Analytics packages may be public or private. In general, packages of public analytics contain analytics data that are the same for all users for a given social media document, and packages of private analytics contain analytics data that are specific to each user. Analytics packages may be bundled or purchased. In general, bundled analytics packages are available to any user, and purchased insight analytics are available to users who have purchased subscriptions for the individual analytics packages.

Figure 3:
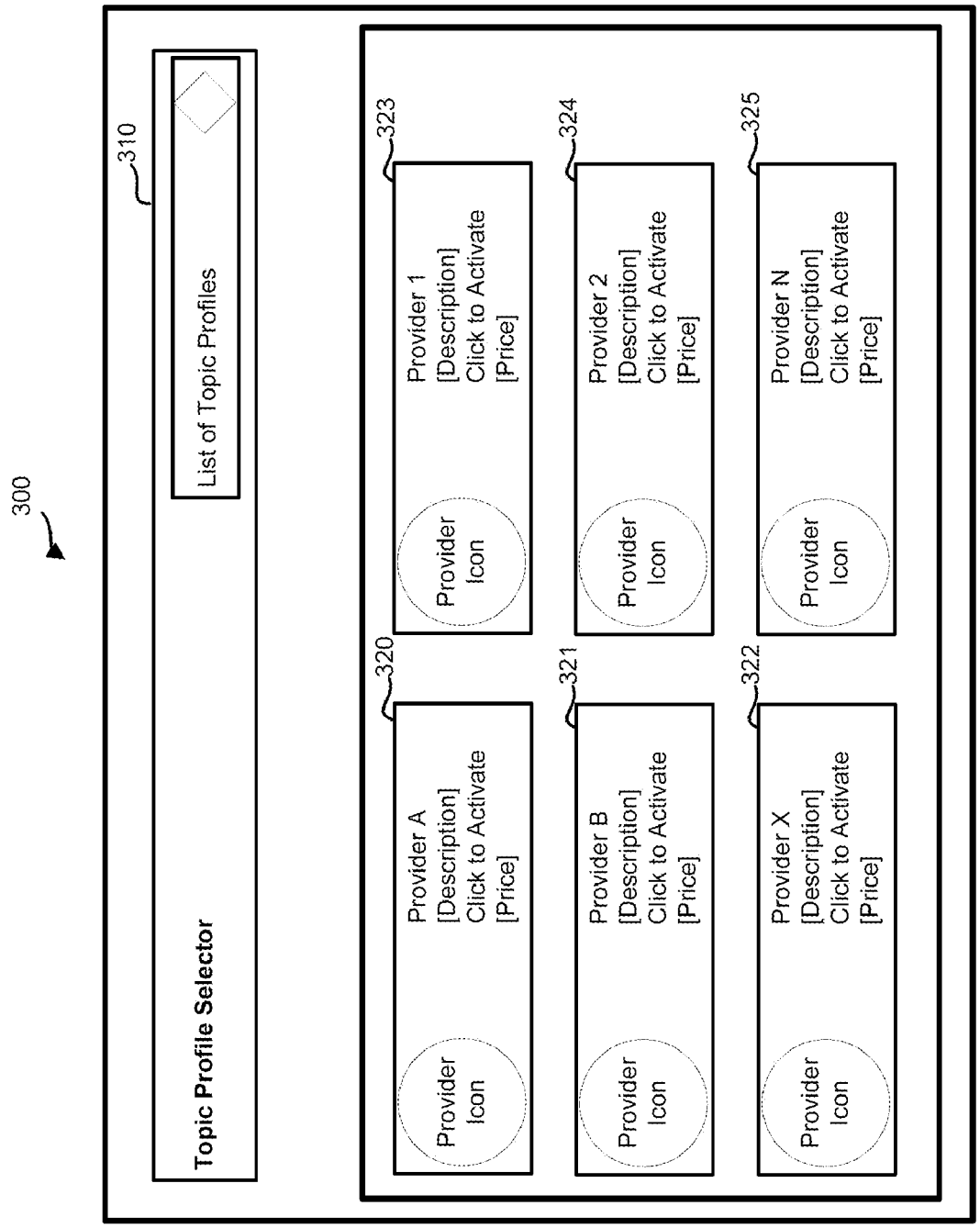
FIG. 3 is an example of an interface presented to the user by the subscription module of FIG. 2 in accordance with an exemplary embodiment.

FIG. 3 is an example of an interface 300 presented to the user by the subscription module 120 of FIG. 2. The subscription interface 300 may be presented to the user on the user interface 170 (FIG. 1). As introduced above, the user may select one or more topics at selection 310 and one or more analytics providers at selections 320-325. Any arrangement for presenting selection options to the user may be provided. Upon completion of the subscription, the subscription module 120 provides the topic and analytics provider selections to the control module 110, which initiates the acquisition and analysis of the social media data as requested by the user.

Figure 4:
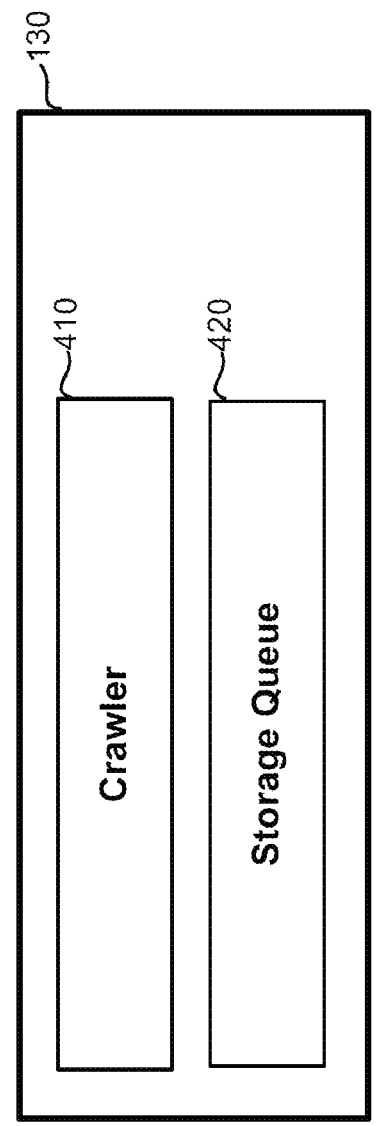
FIG. 4 is a block diagram of a social media acquisition module of the system of FIG. 1 in accordance with an exemplary embodiment.

As noted above, the social media acquisition module 130 is configured to retrieve social media data based on the selections of the user. FIG. 4 is a block diagram of the social media acquisition module 130 of the system 100 of FIG. 1 in accordance with an exemplary embodiment. Although the user topic profile selections are discussed above as being generated by the subscription module 120, the social media acquisition module 130 may receive topic profile selections from other sources.

The social media acquisition module 130 includes a crawler submodule 410 that functions to search the social medial sources (e.g., sources 102) and to retrieve social media data, including social media content and social media sources, associated with the topic profiles. In one exemplary embodiment, the crawler submodule 410 extracts a list of search keywords from the database 112 and applies those search keywords to external data sources (e.g., social media sources 102) in order to determine if content exists within those sources to crawl. If the external sources provide positive matches to any of the search keywords, the crawler submodule 410 stores the retrieved social media data in a storage queue 420 that provides the social media data to the database 112 as social media documents. In addition to analytics processing described below, the social media acquisition module 140 may present social media data to the user for monitoring and engagement directly with the social media content or sources.

Figure 5:
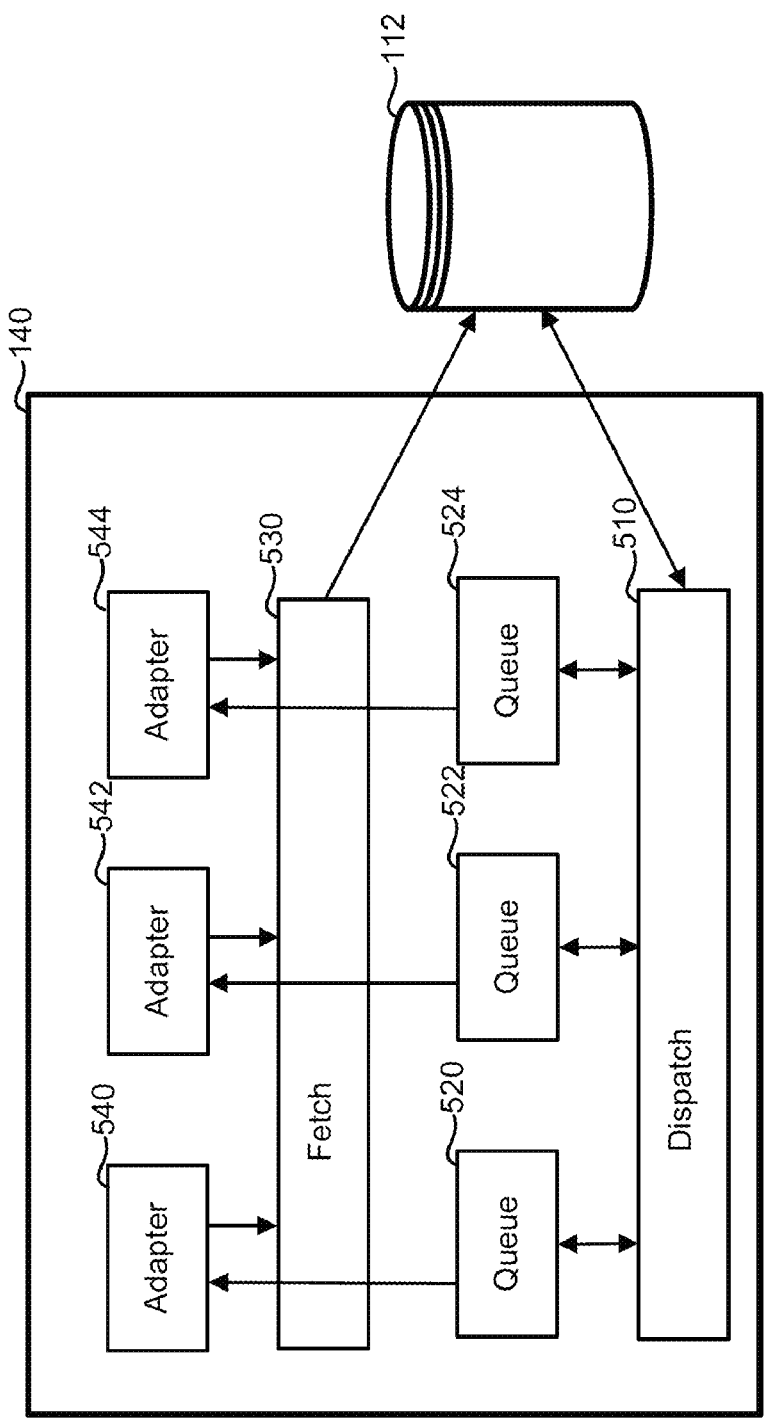
FIG. 5 is a block diagram of an analytics acquisition module of the system of FIG. 1 in accordance with an exemplary embodiment.

FIG. 5 is a block diagram of the analytics acquisition module 140 of the system 100 of FIG. 1 in accordance with an exemplary embodiment. The analytics acquisition module 140 generally includes a dispatch submodule 510, one or more provider queues 520, 522, 524, a fetch submodule 530, and one or more provider adapters 540, 542, 544.

The dispatch submodule 510 generally determines which social media documents require analytics. For example, upon a request for analytics data, the dispatch submodule 510 gathers social media documents from database 112 (e.g., previously stored or retrieved from the social media acquisition module 130) that are associated with the topic profiles selected by the user via the subscription module 120 (FIG. 1).

The dispatch submodule 510 may be, for example, a LinuxOS service and may also receive configuration information from the database 112.

The dispatch submodule 510 places the social media documents on provider queues 520, 522, 524 that store the social media documents for delivery to each provider. As such, the analytics acquisition module 140 includes a provider queue 520, 522, 524 for each possible provider that may be requested by the user. The dispatch submodule 510 may manage the provider queues 520, 522, 524 based on previous activity with respect to the social media documents and analytics providers. For example, the dispatch submodule 510 may only supply social media documents that are older than the last refresh period or queue activity. Any suitable time period may be provided.

Instructions for gathering the analytics information may be in the form of fetch tasks provided by the dispatch submodule 510 on the provider queues 520, 522, 524. The provider queues 520, 522, 524 may be, for example, an ActiveMQ queuing system. Meta-data may be stored in the database 112 for each provider-social media document combination. This enables the dispatch submodule 510 to manage refresh policies for social media documents on a per-provider basis instead of having a single refresh policy. The dispatch submodule 510 may also monitor a document collection in database 112 for historical data requests. When a historical data request is found, the dispatch submodule 510 begins requesting content from the database 112 in reverse chronological order or any other suitable order. A fetch task may also be provided to update the status of the historical data request in the database 112.

During operation, the fetch submodule 530 reads tasks from the provider queues 520, 522, 524 and places the social media data from the provider specific queues 520, 522, 524 into the appropriate provider-specific adapter 540, 542, 544. The fetch submodule 530 may be, for example, a LinuxOS service and receive configuration information from the database 112. Each adapter 540, 542, 544 handles communication with the third party provider and response parsing. The adapters 540, 542, 544 return a standard response containing analytics data that is inserted into the database 112 in the format discussed above. Adapters 540, 542, 54 are responsible for extracting all analytics data in the response from the analytics providers, the analytics data may be stored in database 112 for later retrieval.

The operation of the subscription module 120, social media acquisition module 130, and analytics acquisition module 140 will be described below with reference to the flowchart of FIG. 6.

Figure 6:
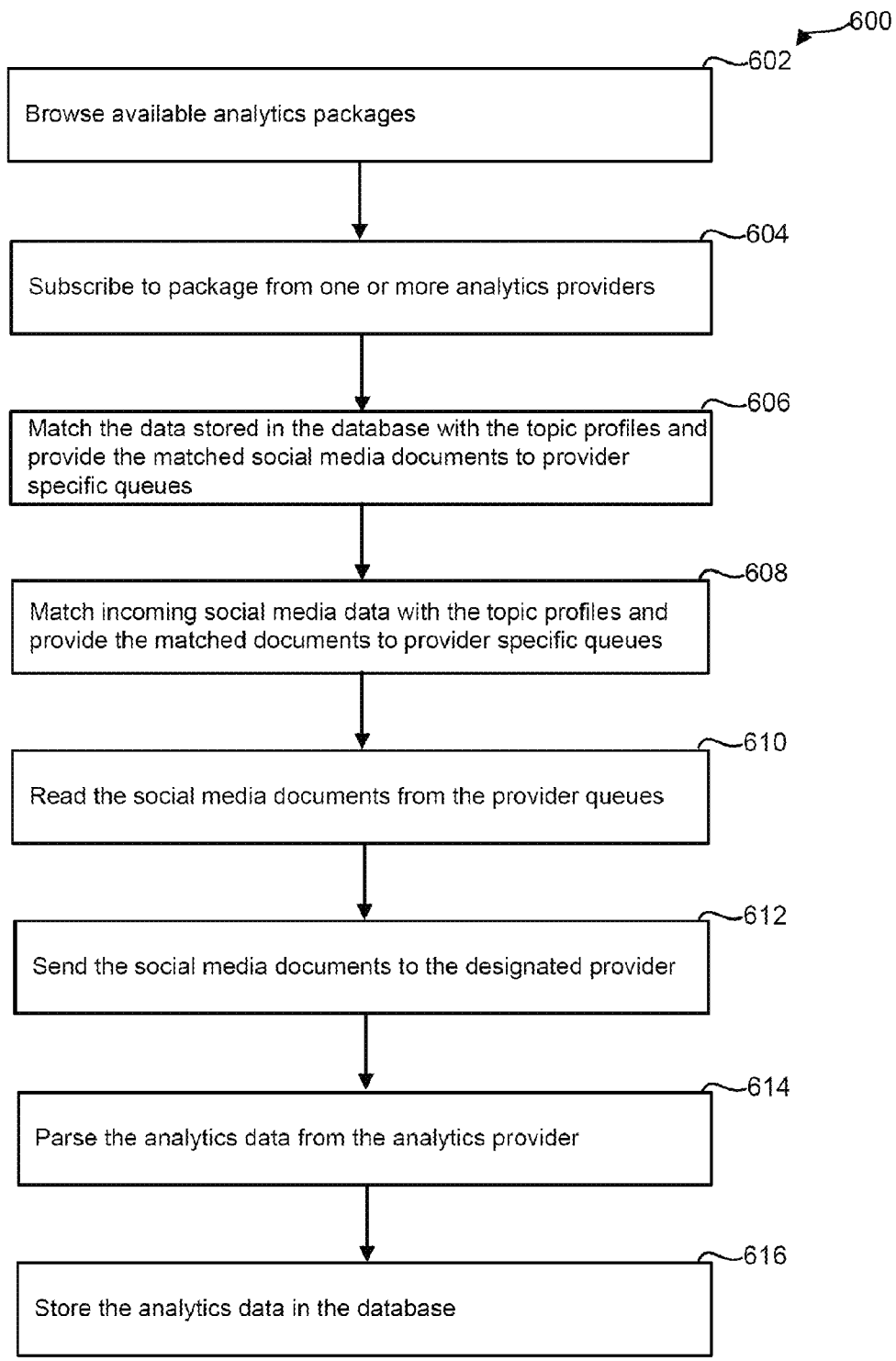
FIG. 6 is a flowchart of a method for the subscription and acquisition of analytics data in accordance with an exemplary embodiment.

FIG. 6 is an exemplary method 600 for a system (e.g., system 100) to enable the subscription and acquisition of analytics data. FIG. 6 will be described with reference to FIGS. 2-5.

In step 602, the subscription module 120 enables a user to browse available analytics packages. In step 604, the subscription module 120 enables the user to subscribe to an analytics service or package from one or more of the analytics providers for one or more topic profiles.

In step 606, the social media acquisition module 130 matches the data stored in the database 112 with the topic profiles and provides the appropriate social media documents to the analytics acquisition module 140 for the provider specific queues 520, 522, 524. In step 608, the social media acquisition module 130 also acquires social media data from the social media sources and provides the resulting social media documents to the analytics acquisition module 140 for the provider specific queues 520, 522, 524. As noted above, the analytics acquisition module 140 may queue the social media documents in steps 606 and 608 based on an evaluation of recent activity. If social media documents have been placed in the provider specific queues 520, 522, 524 within a predetermined preceding timeframe, the analytics acquisition module 140 may delay or restrict queuing of the social media documents.

In step 610, the fetch submodule 530 reads the social media documents from the provider queues 520, 522, 524. In step 612, the fetch submodule 530 sends the social media documents to the designated provider. Although not shown, if the fetch submodule 530 determines that the designated provider has exceeded a predetermined rate limit, the fetch submodule 530 may delay sending the social media documents to the designated provider.

Upon receiving a successful response in step 614, the analytics acquisition module 140 may parse the analytics data from the analytics provider. In step 616, the analytics acquisition module 140 may store the analytics data in the database 112. The user may access the analytics data via the data presentation module 150 as described below.

Figure 7:
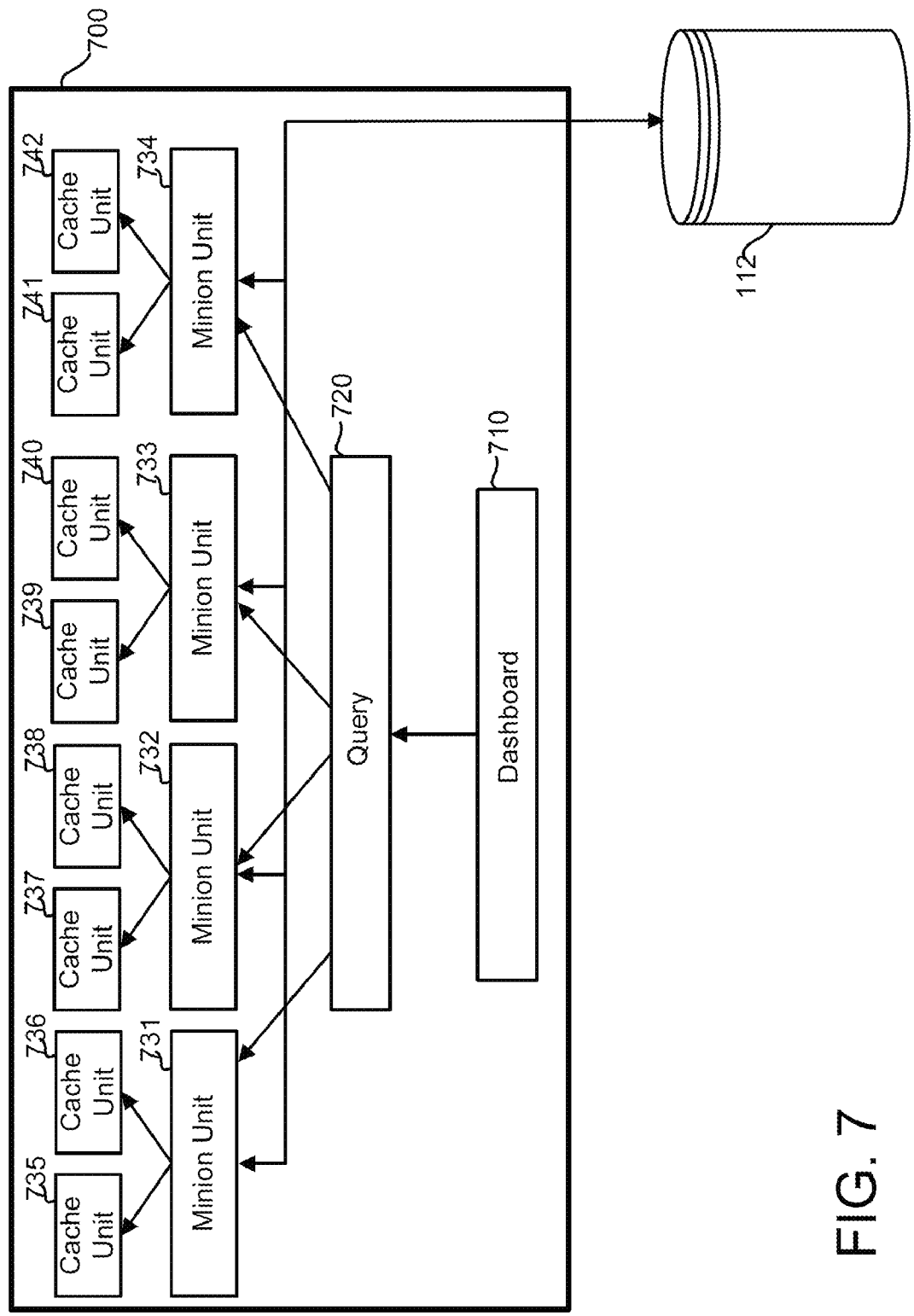
FIG. 7 is a block diagram of a data presentation module of the system of FIG. 1 in accordance with an exemplary embodiment.

FIG. 7 is a block diagram of the data presentation module 150 of the system 100 of FIG. 1 in accordance with an exemplary embodiment. The data presentation module 150 includes a dashboard application 710, a query submodule 720, and a server application 730. The server application 730 may have one or more minion units 731-734 and one or more cache units 735-742. In general, the minion units 731-734 are processing units that support query requests via the cache units 735-742. The cache units 735-742 may be, for example, a Redis-based system. In general, the cache units 735-742 are an advanced key-value store or in-memory caching system. The data stored in the cache units 735-742 is not volatile and may be stored in in various programmatic data types, such as strings list, sets, and ordered sets, that may be manipulated with atomic operations to push/pop elements, add/remove elements, perform server side union, intersection, difference between sets and other functions. Additional minion units and cache units may be added as scalable architecture to support increased query volume.

Data is loaded into the cache units 735-742 by the query submodule 720 from the database 112 such that each cache unit 735-742 holds a slice of the total cached data. A consistent hashing algorithm or other suitable algorithm may be used for mapping keys to the data. This arrangement results in data being spread across multiple cache units 735-742 such that the system 100 responds more quickly to query requests from the user.

Figure 8:
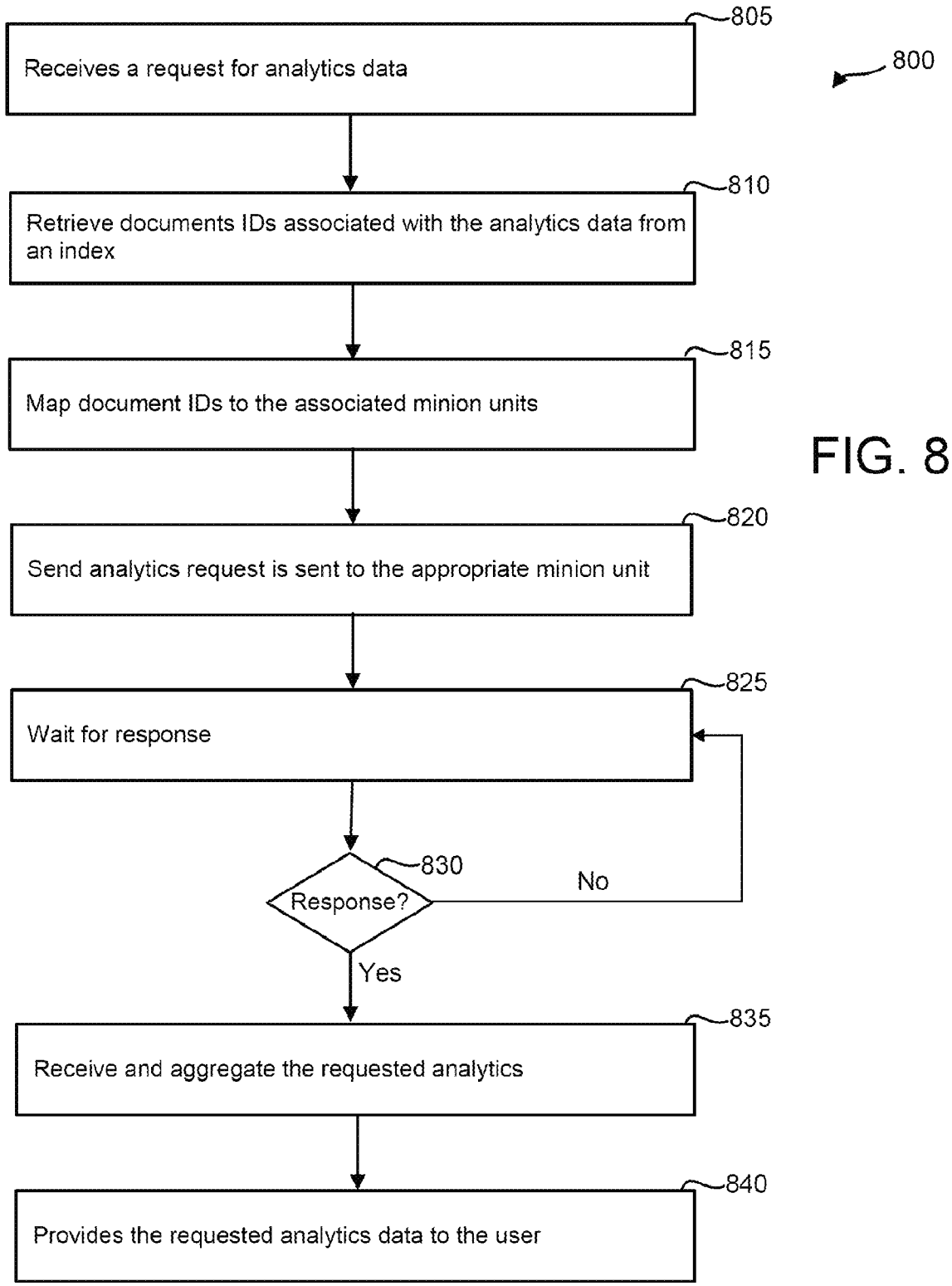
FIG. 8 is a flowchart of a method for providing analytics data to a user in accordance with an exemplary embodiment.

The operation of the data presentation module 150 will be described with the aid of flowcharts. FIG. 8 is a flowchart of a method 800 for providing analytics data to a user, and FIG. 9 a flowchart of a method 900 for retrieving analytics data in response to a processing request.

Referring initially to FIG. 8, in step 805, the query submodule 720 receives a request from the user interface 170 for analytics data. In step 810, the document IDs associated with the analytics data is retrieved from an index. The document IDs may be based on the parameters of the request, such as topic profiles, media types, time frame, and the like. In step 815, the document IDs are mapped to the associated minion units 731-734, and in step 820, the analytics request is sent to the appropriate minion unit 731-734 using protocol buffers. As noted above, each minion unit 731-734 may be responsible for processing document IDs that map to a particular cache unit 735-742. The cache unit 735-742, and thus minion unit 731-734, for a document ID may be calculated by hashing the document ID and then using the least significant bits from the hash value.

In steps 825 and 830, the query submodule 720 waits for a response. In step 835, upon receiving the requested analytics, the query submodule 720 aggregates the partial responses from the minion units 731-734. In step 840, the query submodule 720 provides the requested analytics data to the user.

Figure 9:
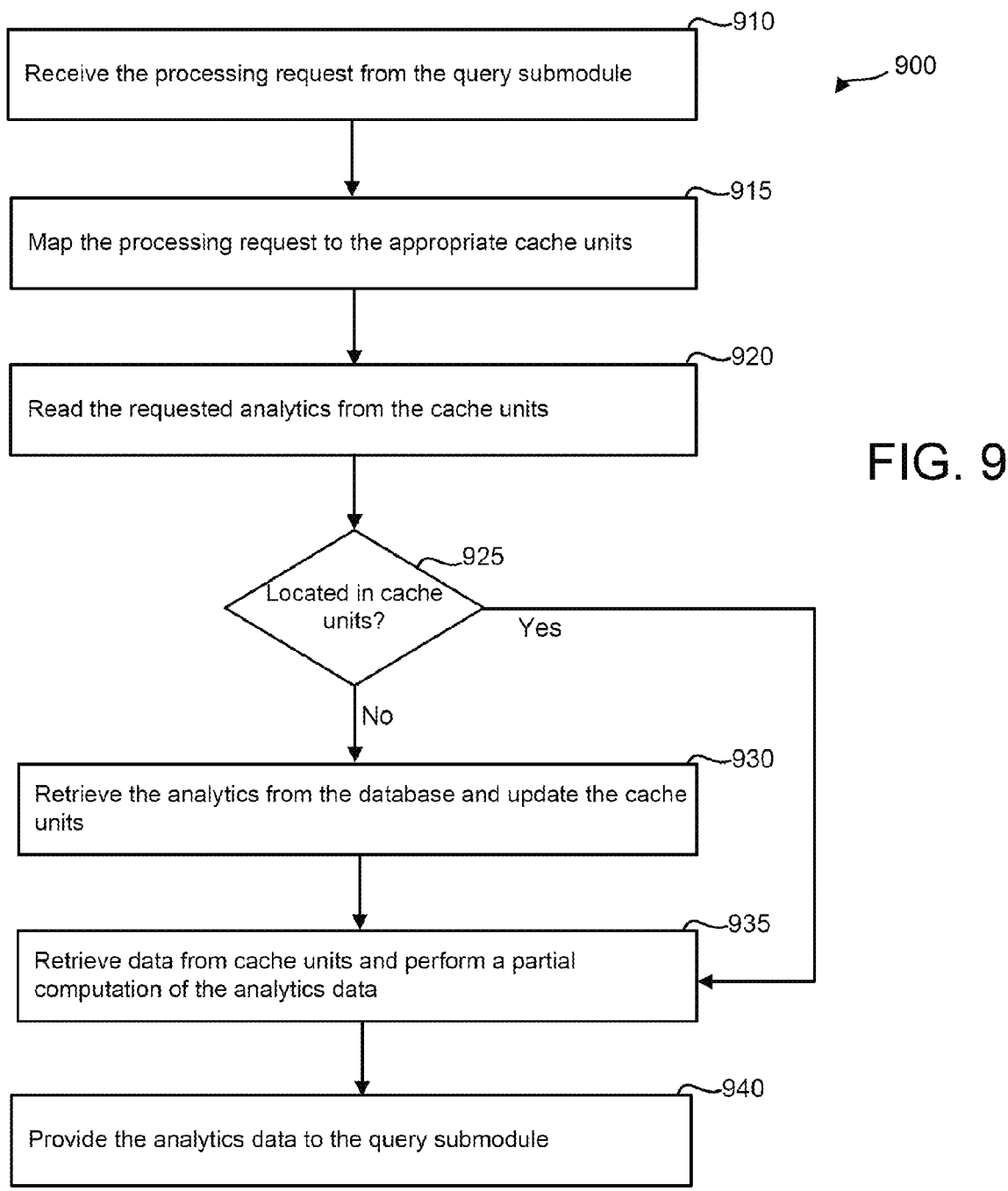
FIG. 9 a flowchart of a method for retrieving analytics data in response to a processing request in accordance with an exemplary embodiment.

Now referring to FIG. 9, in step 910, the minion units 731-734 receive the processing request from the query submodule 720 (e.g, from step 820 in FIG. 8). In step 915, the minion units 731-734 map the processing request to the appropriate cache units 735-742. In step 920, the minion units 731-734 read the requested analytics from the cache units 735-742. In step 925, the minion units 731-734 determine if the requested analytics data is present in the cache units 735-742. In step 930, if the requested analytics data is not in the cache units 735-742, the minion units 731-734 retrieve the analytics from the database 112, and in step 935, update the cache units 735-742. The analytics data may remain in the cache units 735-742 for future requests. The cache units 735-742 may incorporate an optimized time-to-live (TTL) design in order to expire and refresh content. In general, the cache units 735-742 provide a high performance and horizontally scalable mechanism to respond to the queries. In step 940, the minions 731-734 perform a partial computation of the analytics data, and in step 945, the minion units 731-734 provide the analytics data to the query submodule 720 (e.g., to step 835 of FIG. 8).

The minion units 731-734 respond to the query submodule 720 with the aggregated result and the query submodule 720 transfers the data requested to the user interface 170. In one exemplary embodiment, the analytics data returned by the minion units 731-735 to the query submodule 720 may be related to a single topic such as "Company," "Brand," "Person," or "Technology." The analytics data is typically in a consistent format and may have an associated value of the following types: single value, multiple values, countable numeric value, or attributes. Each value generally represents an analytics output, e.g. if a document refers to a celebrity (Jane Doe) in a topic profile, the value "jane doe" would be stored in a form referencing the provider and document ID. Single value analytics types have one value per document or source (and per client for private insights). As an example, source analytics data related to "gender" can have only one value. Multi-value analytics types can have more than one value per document or source (and a unique set of analytics values per client for private analytics data). As an example, a document insight for the analytics type "Company" might list Nike, Reebok, and Keen as company names found in the document. Countable analytics types may have one insight value per document or source (and per client for private packages) whose value is numeric. As such, countable analytics provide alternative values for the query submodule 720 to count by. For example, a user may choose to sum Monthly Page Views for a set of blog posts instead of just counting the number of blog posts. Attribute types do not have any aggregations or operations performed on them and may be considered metadata analytics that are simply passed-through for presentation to the user.

Depending on the value type, the minion units 731-734 and/or the query submodule 720 may perform specific operations before presenting the data to the requesting user interface. Such operations may include: 1) querying for top n values for an insight type (e.g., top 5 brands or top 10 cities); 2) drilldown filtering (e.g., top 10 people in on-topic posts with company="Dell"); 3) segmenting results by type (e.g., top 10 companies segmented by intent to purchase); and 4) counting by countable types (e.g., monthly page views). In one exemplary embodiment, filtering, segmenting, and counting by other analytics types are all done within the minion units 731-734 according to the requested operations and document IDs submitted to the minion units 731-734 from the query submodule 720.

As noted above, the results from providers 104, 106 may be compounded or intertwined in a manner not otherwise available from a single provider 104, 106. As an example, analytics providers 104, 106 may supply data represented as provider.datatype=value. As such, the system 100 may generate a set of counts for provider1.datatype1 where the values are value1, value2, value3 and value4 and the counts are the number of documents having each value. The system may also generate a set of counts for provider1.datatype1 that only includes documents that also have provider2.datatype2=value5. Alternatively, the system 100 may generate a set for counts for provider1.datatype1 but instead of counting the number of documents having each value, the system can sum the values from provider3.datatype6. As a plain language example, a first provider may provide counts associated with models of cars. A second provider may provide counts associated with documents that mention soccer to yield counts associated with models of cars from documents that mention soccer. A third provider may provide sentiment rating to yield counts associated with models of cars from documents that mention soccer segmented by sentiment rating. A fourth provider may provide influencer rating to yield the sum of influencer ratings for documents grouped by models of cars but only documents that mention soccer and further group segmentation by sentiment rating.

Figure 10:
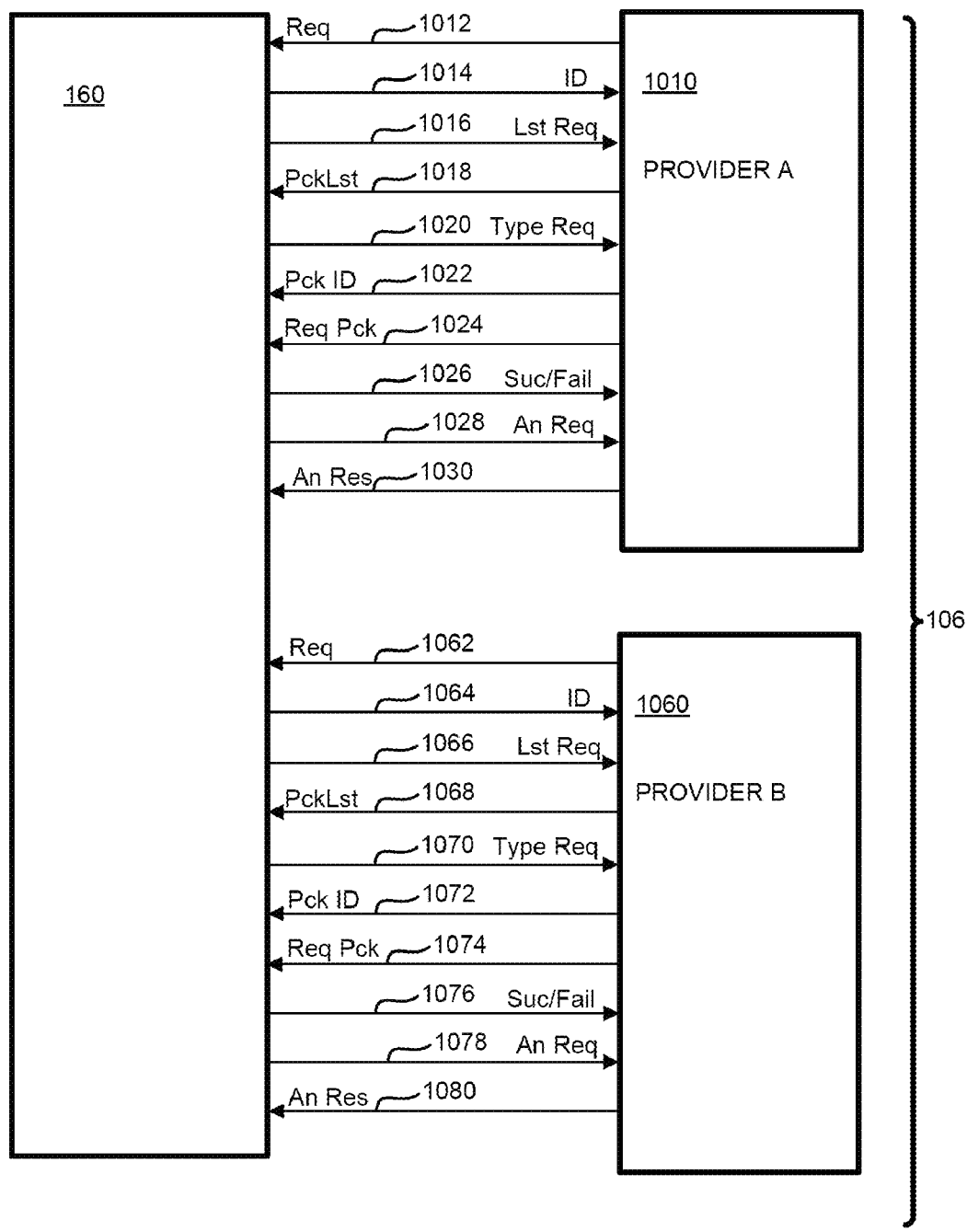
FIG. 10 is a block diagram illustrating the data flow of an API module of the system of FIG. 1 in accordance with an exemplary embodiment.

FIG. 10 is a block diagram illustrating the data flow of the API module 160 of the system 100 of FIG. 1 in accordance with an exemplary embodiment. As noted above, the API module 160 is an interface that enables parallel development from sources outside of the system 100, particularly by analytics providers 106. The API module 160 enables the system 100 to provide and combine analytics from multiple analytics providers 106 by transforming data from disparate sources and normalizing the data prior to storage in the database 112.

As such, FIG. 10 describes the interaction between the API module 160 and analytics providers 106 (in this example labeled first analytics provider 1010 and second analytics provider 1060). Data flows 1012, 1062 represent a registration and authentication requests from respective analytics providers 1010, 1060. The registration and authentication request 1012, 1062 may include, as examples, a package name, access restrictions, pricing, and type. In response to data flows 1012, 1062, the system 100 provides package IDs 1014, 1064. Data flows 1016, 1066 represent list requests to the analytics providers 1010, 1060. In response, the analytics providers 1010, 1060 provide a list of available packages 1018, 1068. Data flows 1020, 1070 represent type requests for a package ID to the analytics providers 1010, 1060. In response, the analytics providers 1010, 1060 provide the type of package associated with the package ID 1022, 1072. Data flows 1024, 1074 represent registration requests for type of available packages from the analytics providers 1010, 1060. As an example, the registration requests may include a package ID, a type name, a display name, and a value type. In response, the API module 160 returns a success or failure indication 1026, 1076 to the analytics providers 1010, 1060.

The API module 160 further provides analytics requests 1028, 1078 to the providers 1010, 1060. The analytics requests 1028, 1078 may include the social media data. In one exemplary embodiment, API module 160 is responsible for reading from the dispatch submodule 510 in the analytics acquisition module 140 to fulfill analytics requests 1028, 1078 for the analytics providers 1010, 1060. In response, the providers 1010, 1060 return the requested analytics results 1030, 1080, which may be presented to the user as discussed above. Although data flows are illustrated for two analytics providers, any number of analytics providers may interact with the system 100 to provide analytics data.

Accordingly, improved methods and systems for processing social media conversations across multiple data analytics providers have been provided. The methods and systems allow any provider of analytics data to programmatically interface with the platform in order to make data available for user subscription and further allow a user to subscribe to any source of those analytics data. The methods and systems accept large unstructured and undefined volumes of data from any social media source. The methods and systems are able to ingest and store the data from those sources, including sources of data with different structure and format, and the data transfer is be resilient to network latency and network failure. As a result, the user is able to retrieve and perform "interactive-time" analysis on the large volume of unstructured and undefined data via the user interface. A multi-dimensional query mechanism is provided that allows the rapid retrieval and aggregation of for large amounts of data. As a result, the methods and systems provide the ability to combine and intertwine analytics about social media posts and social media authors sourced from multiple providers of insights analytics in a "real-time" fashion.

Reference is additionally made to previous patent applications to the present assignee, including application Ser. No. 12/174,345 filed on Jul. 16, 2008; application Ser. No. 12/333,277 filed on Dec. 11, 2009; application Ser. No. 12/356,429 filed on Jan. 20, 2009; application Ser. No. 12/437,418 filed on May 7, 2009; and application Ser. No. 12/819,402 filed on Jun. 21, 2010, entire contents of which are incorporated herein by reference.

Figure 11:
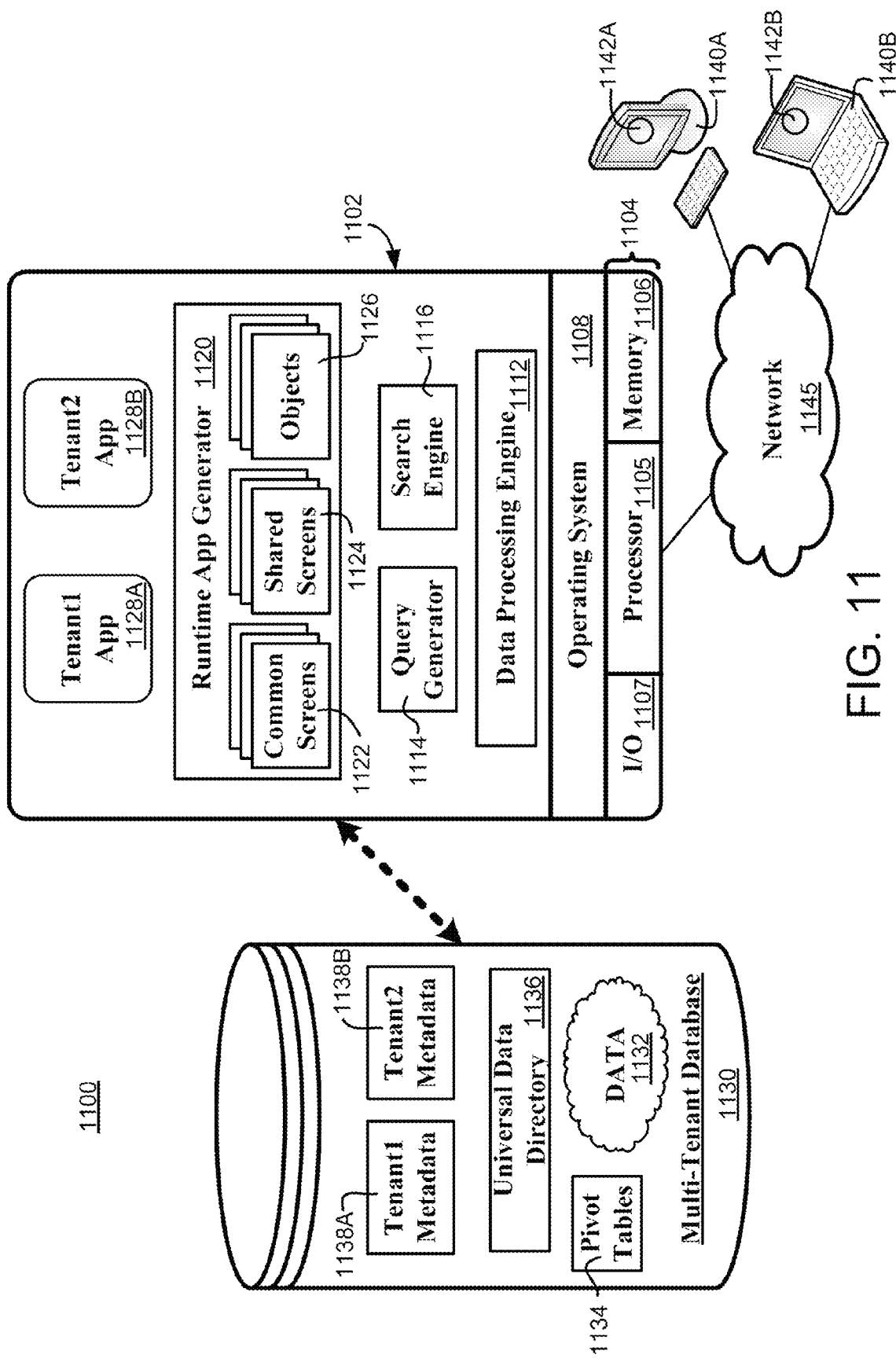
FIG. 11 is a block diagram of a multi-tenant application system that may implement the system of FIG. 1 in accordance with an exemplary embodiment.

In some exemplary embodiments, the system 100 may be implemented in a multi-tenant application system, such as the multi-tenant application system 1100 illustrated in FIG. 11. Referring to FIG. 11, an exemplary multi-tenant application system 1100 suitably includes a server 1102 that dynamically creates virtual applications 1128A-B based upon data 1132 from a common database 1130 that is shared between multiple tenants. Data and services generated by the virtual applications 1128A-B are provided via network 1145 to any number of client devices 1140A-B, as desired. Each virtual application 1128A-B is suitably generated at run-time using a common platform 1110 that securely provides access to data 1132 in database 1130 for each of the various tenants subscribing to system 1100.

A "tenant" generally refers to a group of users that shares access to common data within database 1130. Tenants may represent customers, customer departments, business or legal organizations, and/or any other entities that maintain data for particular sets of users within system 1100. Using the examples above, a tenant may be a user that requests social media data or analytics data or analytics providers. Although multiple tenants may share access to a common server 1102 and database 1130, the particular data and services provided from server 1102 to each tenant can be securely isolated from those provided to other tenants, as described more fully below. The multi-tenant architecture therefore allows different sets of users to share functionality without necessarily sharing each other's data 1132.

Database 1130 is any sort of repository or other data storage system capable of storing and managing data 1132 associated with any number of tenants. Database 1130 may be implemented using any type of conventional database server hardware. In various embodiments, database 1130 shares processing hardware 1104 with server 1102. In other embodiments, database 1130 is implemented using separate physical and/or virtual database server hardware that communicates with server 1102 to perform the various functions described herein. With reference to the system 100 described with respect to FIGS. 1-10, the database 1130 may include the database 112.

Data 1132 may be organized and formatted in any manner to support multi-tenant application platform 1110. In various embodiments, data 1132 is suitably organized into a relatively small number of large data tables to maintain a semi-amorphous "heap"-type format. Data 1132 can then be organized as needed for a particular virtual application 1128A-B. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 1138A-B for each tenant, as desired. Rather than forcing data 1132 into an inflexible global structure that is common to all tenants and applications, then, database 1130 is organized to be relatively amorphous, with tables 1134 and metadata 1136-1138 providing additional structure on an as-needed basis. To that end, application platform 1110 suitably uses tables 1134 and/or metadata 1136, 1138 to generate "virtual" components of applications 1128A-B to logically obtain, process, and present the relatively amorphous data 1132 from database 1130.

Server 1102 is implemented using one or more actual and/or virtual computing systems that collectively provide a dynamic application platform 1110 for generating virtual applications 1128A-B. Server 1102 operates with any sort of conventional computing hardware 1104, such as any processor 1105, memory 1106, input/output features 1107 and the like. Processor 1105 may be implemented using one or more of microprocessors, microcontrol modules, processing cores and/or other computing resources spread across any number of distributed or integrated systems, including any number of "cloud-based" or other virtual systems. Memory 1106 represents any non-transitory short or long term storage capable of storing programming instructions for execution on processor 1105, including any sort of random access memory (RAM), read only memory (ROM), flash memory, magnetic or optical mass storage, and/or the like. Input/output features 1107 represent conventional interfaces to networks (e.g., to network 1145, or any other local area, wide area or other network), mass storage, display devices, data entry devices and/or the like. In a typical embodiment, application platform 1110 gains access to processing resources, communications interfaces and other features of hardware 1104 using any sort of conventional or proprietary operating system 1108. As noted above, server 1102 may be implemented using a cluster of actual and/or virtual servers operating in conjunction with each other, typically in association with conventional network communications, cluster management, load balancing and other features as appropriate.

Application platform 1110 is any sort of software application or other data processing engine that generates virtual applications 1128A-B that provide data and/or services to client devices 1140A-B. Virtual applications 1128A-B are typically generated at run-time in response to queries received from client devices 1140A-B, as described more fully below. In the example illustrated in FIG. 11, application platform 1110 includes a bulk data processing engine 1112, a query generator 1114, a search engine 1116 that provides text indexing and other search functionality, and a runtime application generator 1120. Each of these features may be implemented as a separate process or other module, and many equivalent embodiments could include different and/or additional features, components or other modules as desired.

Runtime application generator 1120 dynamically builds and executes virtual applications 1128A-B in response to specific requests received from client devices 1140A-B. Virtual applications 1128A-B created by tenants are typically constructed in accordance with tenant-specific metadata 1138, which describes the particular tables, reports, interfaces and/or other features of the particular application. In various embodiments, each virtual application 1128A-B generates dynamic web content that can be served to a browser or other client program 1142A-B associated with client device 1140A-B, as appropriate. Data processing engine 1112 performs bulk processing operations on data 1132 such as uploads or downloads, updates, online transaction processing and/or the like.

In operation, then, developers use application platform 1110 to create data-driven virtual applications 1128A-B for the tenants that they support. Such applications 1128A-B may make use of interface features such as tenant-specific screens 1124, universal screens 1122 or the like. Any number of tenant-specific and/or universal objects 1126 may also be available for integration into tenant-developed applications 1128A-B. Data 1132 associated with each application 1128A-B is provided to database 1130, as appropriate, and stored until requested, along with metadata 1138 that describes the particular features (e.g., reports, tables, functions, etc.) of tenant-specific application 1128A-B until needed.

Data and services provided by server 1102 can be retrieved using any sort of personal computer, mobile telephone, tablet or other network-enabled client device 1140 on network 1145. Typically, the user operates a conventional browser or other client program 1142 to contact server 1102 via network 1145 using, for example, the hypertext transport protocol (HTTP) or the like. The user typically authenticates his or her identity to the server 1102 to obtain a session identification ("SessionID") that identifies the user in subsequent communications with server 1102. When the identified user requests access to a virtual application 1128, application generator 1120 suitably creates the application at run time based upon metadata 1136 and 1138, as appropriate. Query generator 1114 suitably obtains the requested data 1132 from database 1130 as needed to populate the tables, reports or other features of virtual application 1128. As noted above, the virtual application 1128 may contain Java, ActiveX or other content that can be presented using conventional client software 1142 running on client device 1140; other embodiments may simply provide dynamic web or other content that can be presented and viewed by the user, as desired Generally speaking, the various functions and features described above may be carried out with any sort of hardware, software and/or firmware logic that is stored and/or executed on any platform. Some or all aspects of exemplary embodiments may be carried out, for example, by logic executing within system 100 in FIG. 1 or system 1110 in FIG. 11, for example, using software or firmware logic that is stored in memory and executed by processor as part of application platform. The particular hardware, software and/or firmware logic may vary from context to context, implementation to implementation, and embodiment to embodiment in accordance with the various features, structures and environments set forth herein. The particular means used to implement each of the various functions may be any sort of processing structures that are capable of executing software and/or firmware logic in any format, and/or any sort of application-specific or general purpose hardware, including any sort of discrete and/or integrated circuitry.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for processing social media data, comprising the steps of:
   receiving a request from a first user of a plurality of users for social media analytics of a first set of social media data;
   receiving a first communication from a first analytics provider to initiate sending the first set of social media data to the first analytics provider and receiving a second communication from a second analytics provider to initiate sending the first set of social media data to the second analytics provider, wherein the first analytics provider and the second analytics provider are third party analytics providers;
   receiving first analytics data from the first data analytics provider and second analytics data from the second analytics provider;
   storing the first analytics data and the second analytics data in a database; and
   presenting the first analytics data and the second analytics data to the first user.

2. The method of claim 1, further comprising receiving a subscription from the user associated with the first analytics provider and the second analytics provider, wherein the subscription includes a topic selection from the first user of a topic profile from a list of available topic profiles and a provider selection from the first user of both of the first analytics provider and the second analytics provider from a list of available analytics providers.

3. The method of claim 1, further comprising the step of retrieving the social media data from social media sources.

4. The method of claim 1, wherein the storing step comprises storing the first analytics data and the second analytics data in a document-based, non-hierarchical database.

5. The method of claim 1, wherein the sending step comprises
   gathering social media documents associated with the social media data; and
   placing a first set of the social media documents in a first queue associated with the first analytics provider and a second set of social media documents in a second queue associated with the second analytics provider.

6. The method of claim 1, wherein the receiving step includes receiving formatted first analytics data from the first analytics provider via an API module and receiving formatted second analytics data from the second analytics provider via the API module.

7. A method for processing social media data, comprising the steps of:
   receiving a request from a first user of a plurality of users for social media analytics of a first set of social media data;
   sending the first set of social media data to a first analytics provider and a second analytics provider, wherein the first analytics provider and the second analytics provider are third party analytics providers, wherein sending step further comprises
   gathering social media documents associated with the social media data;
   placing a first set of the social media documents in a first queue associated with the first analytics provider and a second set of social media documents in a second queue associated with the second analytics provider;
   fetching the first set of social media documents from the first queue and sending the first set of documents to a first adapter for transfer to the first analytics provider; and
   fetching the second set of social media documents from the second queue and sending the second set of documents to a second adapter for transfer to the second analytics provider, wherein the first adapter is different from the second adapter;
   storing the first analytics data and the second analytics data in a database; and
   presenting the first analytics data and the second analytics data to the first user.

8. The method of claim 7, wherein the receiving step comprises
   receiving the first analytics data from the first analytics provider at the first adapter; and
   receiving the second analytics data from the second analytics provider at the second adapter.

9. The method of claim 1, wherein the presenting step comprises
   generating an analytics request with a query submodule; and
   retrieving the first analytics data and the second analytics data based on the analytics request.

10. The method of claim 9, wherein the retrieving step comprises retrieving the first analytics data and the second analytics data with a plurality of minion units and a plurality of cache units.

11. The method of claim 10, wherein the retrieving step further comprises
    determining if the first analytics data and the second analytics data are in the plurality of cache units; and
    retrieving, if the first analytics data and the second analytics data are not in the plurality of cache units, the first analytics data and the second analytics data from the database and storing the first analytics data and the second analytics data in the plurality of cache units.

12. The method of claim 11, wherein the retrieving step further comprises aggregating the first analytics data and the second analytics data from the plurality of cache units.

13. The method of claim 7, wherein the storing step comprises storing the first analytics data and the second analytics data in a multi-tenant database system, wherein the multi-tenant database system includes a common database configured to store first tenant data and second tenant data such that access to the first tenant data is securely isolated from second tenant data.

14. A system for processing social media data, comprising:
a computer, having a processor and a computer readable storage medium storing computer readable instructions for execution by the processor, to form the following modules:
- a subscription module configured to receive a request from a first user of a plurality of users for social media analytics of a first set of social media data;
- an analytics acquisition module configured to send the first set of social media data to a first analytics provider and a second analytics provider, to receive first analytics data from the first data analytics provider and second analytics data from the second analytics provider, and to store the first analytics data and the second analytics data in a database, wherein the first analytics provider and the second analytics provider are third party analytics providers,
wherein the analytics acquisition module is further configured to
gather social media documents associated with the social media data; and
place a first set of the social media documents in a first queue associated with the first analytics provider and a second set of social media documents in a second queue associated with the second analytics provider,
fetch the first set of social media documents from the first queue and send the first set of documents to a first adapter for transfer to the first analytics provider; and
fetch the second set of social media documents from the second queue and send the second set of documents to a second adapter for transfer to the second analytics provider; and
a data presentation module configured to present the first analytics data and the second analytics data to the first user.

15. The system of claim 14, wherein the subscription module is configured to receive a subscription from the user associated with the first analytics provider and the second analytics provider, wherein the subscription includes a topic selection from the user of a topic profile from a list of available topic profiles and a provider selection from the user of both of the first analytics provider and the second analytics provider from a list of available analytics providers.

16. The system of claim 14, wherein the modules further comprise a social media acquisition module configured to retrieve the social media data from social media sources.

17. The system of claim 14, further comprising a document-based, non-hierarchical database configured to store the first analytics data and the second analytics data.

18. The system of claim 17, wherein the database is a multi-tenant database system, wherein the multi-tenant database system is configured to store first tenant data and second tenant data such that access to the first tenant data is securely isolated from second tenant data.

* * * * *